(12) United States Patent
Yu et al.

(10) Patent No.: US 9,725,105 B2
(45) Date of Patent: Aug. 8, 2017

(54) SHOPPING CONTAINER SAFES AND RELATED METHODS FOR SECURING OBJECTS

(71) Applicant: Toshiba Global Commerce Solutions Holdings Corporation, Tokyo (JP)

(72) Inventors: Shun-Te Yu, New Taipei (TW); Leo Lee, New Taipei (TW); Merrick Wang, Nantou (TW); Vincent Hsieh, New Taipei (TW)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 53 days.

(21) Appl. No.: 14/583,216

(22) Filed: Dec. 26, 2014

(65) Prior Publication Data

US 2016/0185375 A1 Jun. 30, 2016

(51) Int. Cl.
*B62B 3/00* (2006.01)
*B62B 3/14* (2006.01)
*E05B 65/00* (2006.01)
*E05G 1/00* (2006.01)
*E05G 1/04* (2006.01)
*E05B 47/00* (2006.01)

(52) U.S. Cl.
CPC .......... *B62B 3/146* (2013.01); *E05B 65/0075* (2013.01); *E05G 1/005* (2013.01); *E05G 1/04* (2013.01); *E05B 2047/0094* (2013.01)

(58) Field of Classification Search
CPC .............. B62B 3/146; B62B 2202/023; B62B 2202/26; A47C 21/00; B07C 5/3422; E05B 65/0075; E05B 2047/0094; E05G 1/005; E05G 1/04

USPC .......................................................... 224/411
See application file for complete search history.

(56) References Cited

U.S. PATENT DOCUMENTS

| 3,994,505 | A | | 11/1976 | Balha | |
| 4,361,340 | A | | 11/1982 | Soriano | |
| 4,545,591 | A | | 10/1985 | Balha | |
| 4,580,800 | A | | 4/1986 | Upton | |
| 5,002,292 | A | * | 3/1991 | Myers | ..................... B62B 3/146 280/33.992 |
| 5,542,687 | A | * | 8/1996 | Harris | ..................... B62B 3/146 280/33.993 |
| 5,823,302 | A | | 10/1998 | Schweninger | |
| 6,910,697 | B2 | | 6/2005 | Varatharajah | |

(Continued)

OTHER PUBLICATIONS

EMP Shopping Cart Locker, URL: http://www.instructables.com/id/ELF50QQF3B4B4JM/?&sort=ACTIVE&limit=40&offset=40#DISCUSS, website accessed Nov. 16, 2014.

(Continued)

*Primary Examiner* — Peter Helvey
(74) *Attorney, Agent, or Firm* — Olive Law Group, PLLC

(57) ABSTRACT

Shopping container safes and related methods for securing objects are disclosed. According to an aspect, a shopping container includes a load carrier and a safe being attached to the load carrier. The safe may include a door and a lock. The lock may be configured to receive security information from an object. The lock may also determine whether to validate the received security information. Further, the lock may either fasten or unfasten the door of the safe in response to determining to validate the received security information.

9 Claims, 4 Drawing Sheets

(56) References Cited

U.S. PATENT DOCUMENTS

| | | | |
|---|---|---|---|
| 6,997,382 B1 | 2/2006 | Bhri | |
| 7,395,902 B2 | 7/2008 | D'Arca | |
| 7,562,882 B2 | 7/2009 | Acikgoez | |
| 7,780,081 B1 | 8/2010 | Liang | |
| 7,837,205 B2 | 11/2010 | Simard | |
| 8,371,504 B2 | 2/2013 | Connelly | |
| 8,464,843 B2 | 6/2013 | Qiu | |
| 2002/0113695 A1* | 8/2002 | Ernst | G07C 9/00103 340/540 |
| 2003/0085538 A1* | 5/2003 | Mansons | B62B 3/146 280/33.992 |
| 2008/0309389 A1 | 12/2008 | French | |
| 2009/0140505 A1* | 6/2009 | Fryer | B62B 3/1408 280/33.994 |
| 2009/0261545 A1* | 10/2009 | Jones | B62B 3/1472 280/33.994 |
| 2011/0279225 A1* | 11/2011 | Frontino | G07D 11/0066 340/5.3 |
| 2012/0049539 A1 | 3/2012 | Sanvik | |
| 2014/0167960 A1* | 6/2014 | Argue | B07C 5/3422 340/540 |
| 2014/0262874 A1* | 9/2014 | Heim | F41C 33/06 206/317 |

OTHER PUBLICATIONS

Shopping Cart Locker the Easy Way (Improved Range), URL: http://www.instructables/id/Shopping-Cart-Locker-THE-EASY-WAY-Improved-Range/?&sort=ACTIVE&limit=40&offset=40#DISCUSS).

* cited by examiner

SHOPPING CONTAINER SAFES AND RELATED METHODS FOR SECURING OBJECTS

FIELD

Embodiments described herein relate to shopping carts. More particularly, embodiments described herein relate to shopping container safes and related methods for securing objects.

BACKGROUND

Shopping carts, or more generally shopping containers, are often provided by retailers for use by shoppers inside a store for transport of merchandise to a check-out area during shopping and to an automobile. Typically, a shopper will push a shopping cart between aisles of a store during shopping. The shopper may also load one or more baskets (or "load carriers") of the shopping cart with merchandise for purchase.

Often, shoppers will carry along personal items when shopping. For convenience, a shopper may place a personal item in his or her shopping cart. The personal item may be a valuable item such as a purse or an electronic device, such as a smartphone or tablet computer. In such instances, for security reasons the shopper will be motivated to either stay very near to the shopping cart, or remove the item from the shopping cart and carry it when attention is diverted from the area of the shopping cart. These instances can pose an inconvenience to the shopper. Therefore, there is a need for improved techniques for securing shoppers' personal items during shopping.

BRIEF DESCRIPTION OF THE DRAWINGS

The following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

DETAILED DESCRIPTION

Figure 1:
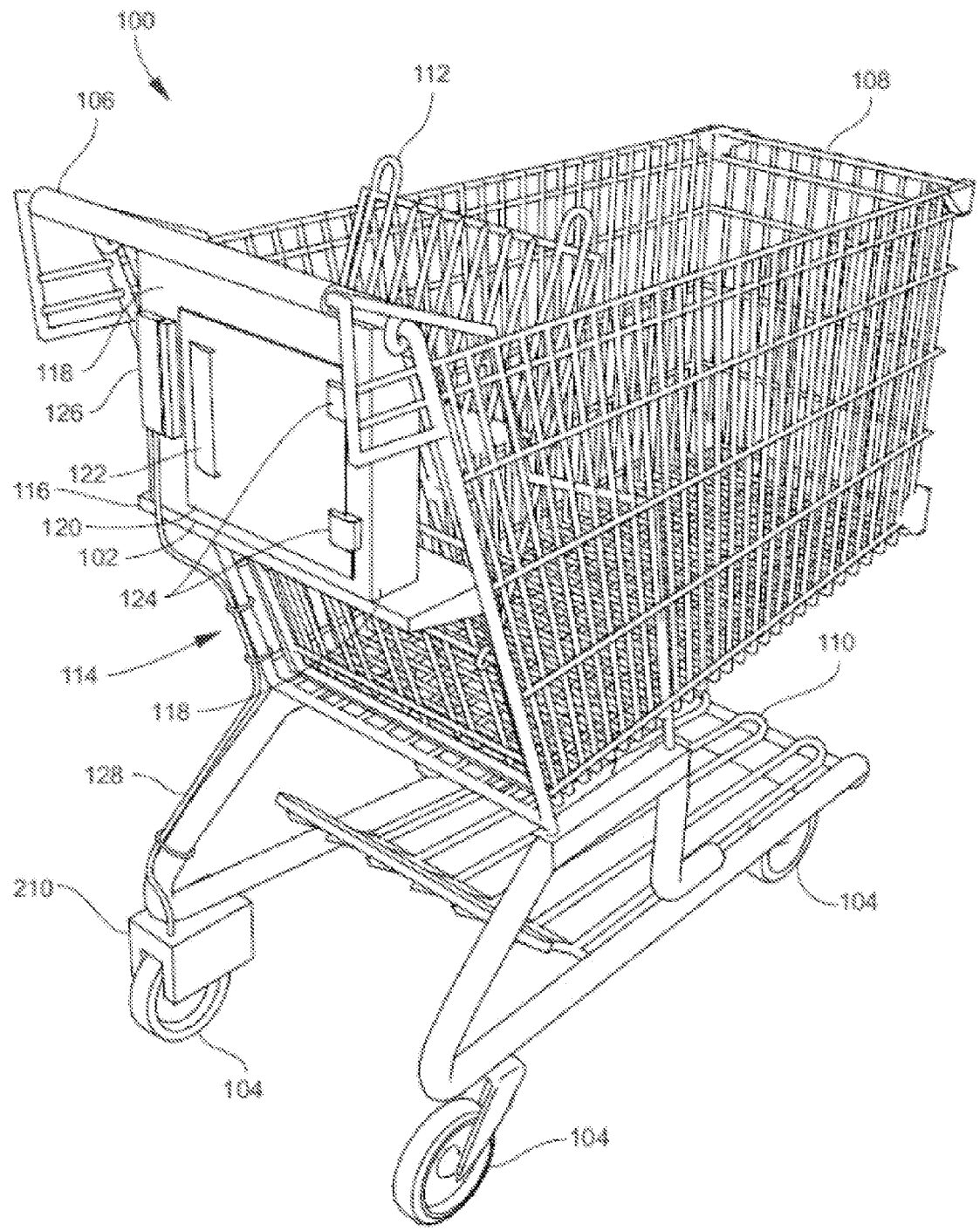
FIG. 1 is a shopping cart having a safe attached thereto for securing objects in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the terms "computing device" and "electronic device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure.

As referred to herein, the term "safe" is generally a secure, lockable box capable of securing objects against theft and/or damage. A safe may include multiple walls. A safe may include one wall or face that is removable or hinged to form a door. The walls and door may define a space for storage and safekeeping of one or more objects. The walls and door of the safe may be made of a sturdy material such as, but not limited to, metal (e.g., steel) or formed of suitable plastic. The safe may include a lock for fastening the door when closed. The lock may be a suitable mechanical or electronic device that can be suitably released. For example, a lock may be released by a physical object such as, but not limited to, a key, a keycard, biometric authentication (e.g., a fingerprint, facial recognition, etc.), a radio-frequent identification (RFID) card, a security token, and the like. In another example, a lock may be released by providing secret information such as, but not limited to, a login and password. In another example, a lock may be released by providing a combination of one or more physical objects and/or secret information. A lock may similarly be engaged to lock by providing a physical object, secret information, or combinations thereof.

As referred to herein, the term "shopping cart" is generally any suitable unit that may be used by a customer or shopper for transport of merchandise or other objects within a retail environment. A shopping cart may also be referred to as a "buggy" or a "trolley." A shopping cart may be used for carrying objects to a check-out location and also to their automobiles. A shopping cart generally includes two or more wheels and a load carrier (e.g., a basket) within which merchandise or other objects may be placed. A shopping cart may include, for example, a handle for maneuvering the cart, such as for pushing, pulling, or steering the cart. In another example, the shopping cart may include a mechanism, such as an electric motor, for turning the wheels of the cart for motion.

FIG. 1 illustrates a shopping cart 100 having a safe 102 attached thereto for securing objects in accordance with embodiments of the present disclosure. For example, the safe 102 may be used for storing and securing personal items of a shopper. Although a shopping cart is used in this example, it should be understood that the shopping cart may alternatively be any other suitable type of container for shopping such as, but not limited to, a shopping basket having a safe attached thereto and configured in accordance with embodiments of the present disclosure. Referring to FIG. 1, the shopping cart 100 may be a nestable or stackable shopping cart including wheels 104 attached to a bottom thereof. The wheels 104 may be caster wheels or any other suitable type of wheels. The wheels 104 may be four swivel caster wheels or two swivel caster wheels and two fixed caster wheels, whereby the fixed caster wheels are provided for the rear area or back side, i.e., on the same end of the shopping cart where where a pushing device or handle 106 is attached.

The wheels 104 may be attached to a primary load carrier or basket 108 and a secondary load carrier 110 of the shopping cart 100. The load carriers 108 and 110 are positioned upward of the wheels 104. The secondary load carrier 110 is positioned beneath the primary load carrier 108. Objects, such as merchandise and a shopper's personal items, may be placed in the load carriers 108 and 110. The shopping cart 100 may include a child's seat 112 that may also function as a load carrier. The load carriers 108 and 110 and seat 112 may be formed of multiple longitudinal and transverse bars. Alternatively, the load carriers 108 and 110 and seat 112 may be formed in any other suitable configuration and material (e.g., plastic).

The safe 102 is attached to a rearward-facing side (or wall) 114 of the load carrier 108. Alternatively, the safe 102 may be attached to any suitable portion of the shopping cart 100. In this example, the safe 102 may rest on and be attached to a platform 116 attached to the side 114. Further, in this example, a top portion of the safe 102 may be attached to a top portion of the side 114. The safe 102 may be attached to the shopping cart 100 in any suitable manner such that the safe 102 cannot be easily removed from the shopping cart 100. For example, the safe 102 may be welded or bolted to the shopping cart 100.

The safe 102 includes multiple walls 118 and a door 120 for enclosing an interior space. The safe 102 may also include a handle 122 attached to the door 120 for use in opening the door 120 to access the interior space. The door 120 may be attached by hinges 124 to a rearward-facing wall 118. The safe 102 may be positioned downward of the handle 122 for ease of access by a shopper.

Figure 2:
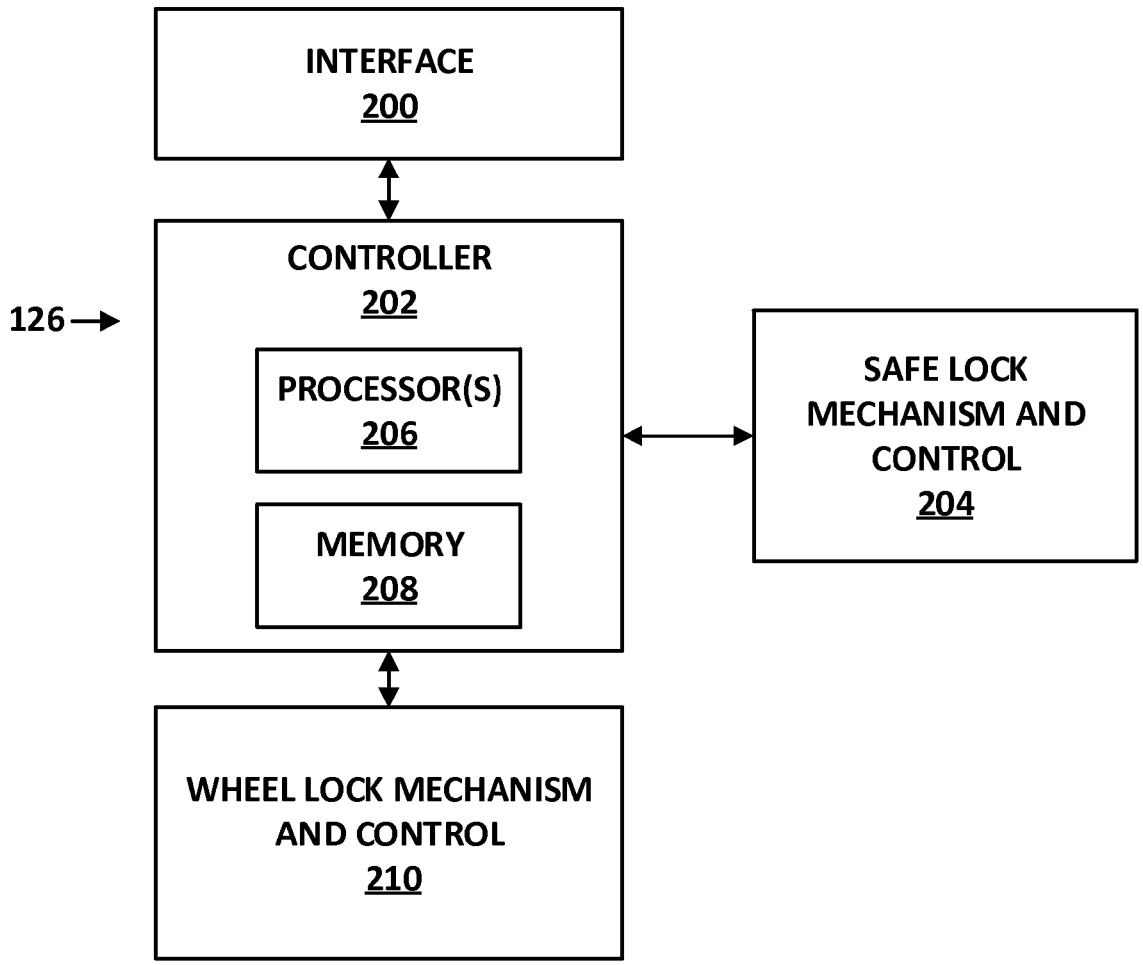
FIG. 2 is a block diagram of an example lock for securing objects within a shopping cart safe in accordance with embodiments of the present disclosure.

In accordance with embodiments of the present disclosure, the safe may include a lock 126 configured to receive security information from an object, to determine whether to validate the received security information, and to either fasten or unfasten the door 120 in response to determining to validate the received security information. For example, FIG. 2 illustrates a block diagram of an example lock 100 for securing objects within a shopping cart safe in accordance with embodiments of the present disclosure. Referring to FIG. 2, the lock 100 includes an interface 200, a controller 202, a safe lock mechanism and control 204, and a wheel lock mechanism and control 206 that may be communicatively connected. The interface 200 may be any suitable device or system configured to receive security information from an object. For example, the interface 200 may be a card reader, a magnetic stripe reader (MSR), an RFID reader, a biometric authentication reader, or any other suitable device configured to read or otherwise read information from another object. In the example of FIG. 1, the interface 200 is a card reader configured to read a customer loyalty card of the shopper. In another example, the interface 200 may be an RFID reader configured to read an RFID tag. In yet another example, the interface 200 may be any suitable wireless communication interface configured to receive a wireless communication from an electronic device (e.g., a smartphone).

The interface 200 may be communicatively connected to the controller 202 for communication of information received or read by the interface 200 to the controller 202. The received information may be security information or other information/data. The controller 202 may use the security information to determine whether the safe lock mechanism and control 204 is to fasten or unfasten the safe 102. The safe lock mechanism and control 204 may be any suitable lock and control mechanism which may be activated and deactivated by the controller 202 for fastening and unfastening a safe door, such as the door 120 of the safe 102 shown in FIG. 1. The controller 202 may be any suitable electronic device or computing device having hardware, software, firmware, or combinations thereof for implementing the functions disclosed herein. For example, the controller 202 may include one or more processors 206 and memory 208 configured to implement the functionality disclosed herein.

In accordance with embodiments of the present disclosure, the controller 202 may be communicatively connected to a wheel lock mechanism and control 210 for controlling the locking and unlocking one or more wheels of a shopping cart. Referring to FIG. 1 for example, the shopping cart 100 may include the wheel lock mechanism and control 210 configured to controllably lock and unlock one of the wheels 104. The wheel lock mechanism and control 210 may be communicatively connected to the lock 126 via a cable 128 for receiving signals to lock or unlock the wheel 104. In other words, the lock 126 may be configured to control the wheel lock mechanism and control 210 to prevent the wheel 104 from rolling or for allowing the wheel 104 to freely roll.

The components of the lock 126 may be powered by any suitable system or technique. For example, the lock 126 may be powered by a battery.

Figure 3:
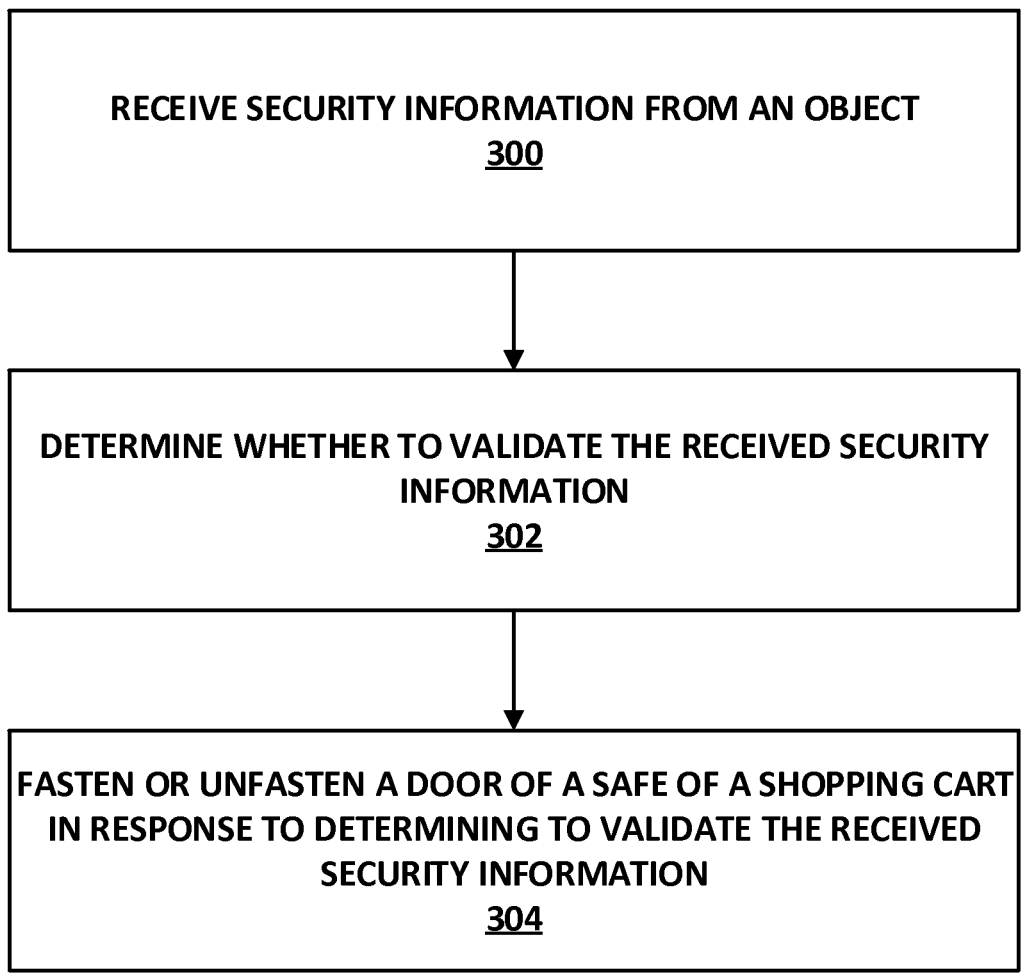
FIG. 3 is a flowchart of an example method for securing objects within a shopping cart safe in accordance with embodiments of the present disclosure.

FIG. 3 illustrates a flowchart of an example method for securing objects within a shopping cart safe in accordance with embodiments of the present disclosure. This example method is described as being implemented by the lock 126 shown in FIGS. 1 and 2, although it should be understood that the method may be implemented by any suitable lock or system.

Referring to FIG. 3, the method includes receiving 300 security information from an object. For example, a shopper utilizing the shopping cart 100 shown in FIG. 1 may use his or her customer loyalty card to interact with the interface of the lock 126. For example, the customer loyalty card may interact with the interface 200 shown in FIG. 2. As an example, the card may include either a barcode or a magnetic stripe that can be read by the interface 200 for accessing stored security information. The barcode or magnetic stripe may have the security information stored thereon. The security information may be, for example, a customer identifier or any other suitable and reliable information for use in locking or unlocking a safe.

In another example of receiving security information, an electronic device, such as a smartphone or tablet computer, may have the security information stored thereon. The electronic device and the interface (e.g., interface 200) may be configured to wirelessly communicate. For example, they may wirelessly communicate by use of a BLUETOOTH® communications technology. When in sufficient proximity, the electronic device may communicate the security information to the interface.

In another example of receiving security information, the shopper may have an RFID tag with the security information stored thereon. When in proximity to one another, the interface (e.g., interface 200) may be configured to wirelessly communicate the security information to the interface.

The method of FIG. 3 includes determining 302 whether to validate the received security information. Continuing the aforementioned example, the interface 200 may communicate received security information to the controller 202 for processing. More particularly, the controller 202 may determine whether to validate the received security information.

For example, the security information may include a code of alphanumeric characters. The controller 202 may suitably compare the code to a stored code to determine whether the security information should be validated. In another example, the security information may include a customer identifier. In this example, the controller 202 may compare the customer identifier to one or more customer identifiers in a database to determine whether the customer identifier is valid for controlling the safe 102 in accordance with embodiments of the present disclosure. The controller 202 may receive validation information (e.g., a code or customer identifier) via a suitable network connection from an authorized source.

The method of FIG. 3 includes fastening or unfastening 304 a door of a safe of a shopping cart in response to determining to validate the received security information. Continuing the aforementioned example, the controller 202 may determine that the security information is valid. Subsequently, the controller 202 may determine to fasten the door 120 of the safe 102 (if the door is unlocked) in response to determining that the security information is valid. For example, the controller 202 may communicate an instruction to the safe lock mechanism and control 204 to control the door of the safe to be fastened in response to the validation.

In another example, the controller 202 may determine that the security information is valid when the safe is locked. Subsequently, in this example, the controller 202 may determine to unfasten the door 120 of the safe 102 in response to determining that the security information is valid. For example, the controller 202 may communicate an instruction to the safe lock mechanism and control 204 to control the door of the safe to be unfastened in response to the validation.

In yet another example, the controller 202 may determine not to validate the security information. For example, the controller 202 may compare an identifier or code to a database of identifiers and/or codes, and may determine that there is no match. In this case, the controller 202 may not take any action to fasten or unfasten the door 120. Further, in this case, the controller 202 may take action to prevent the fastening or unfastening of the door 120 in response to determining not to validate the security information.

Figure 4:
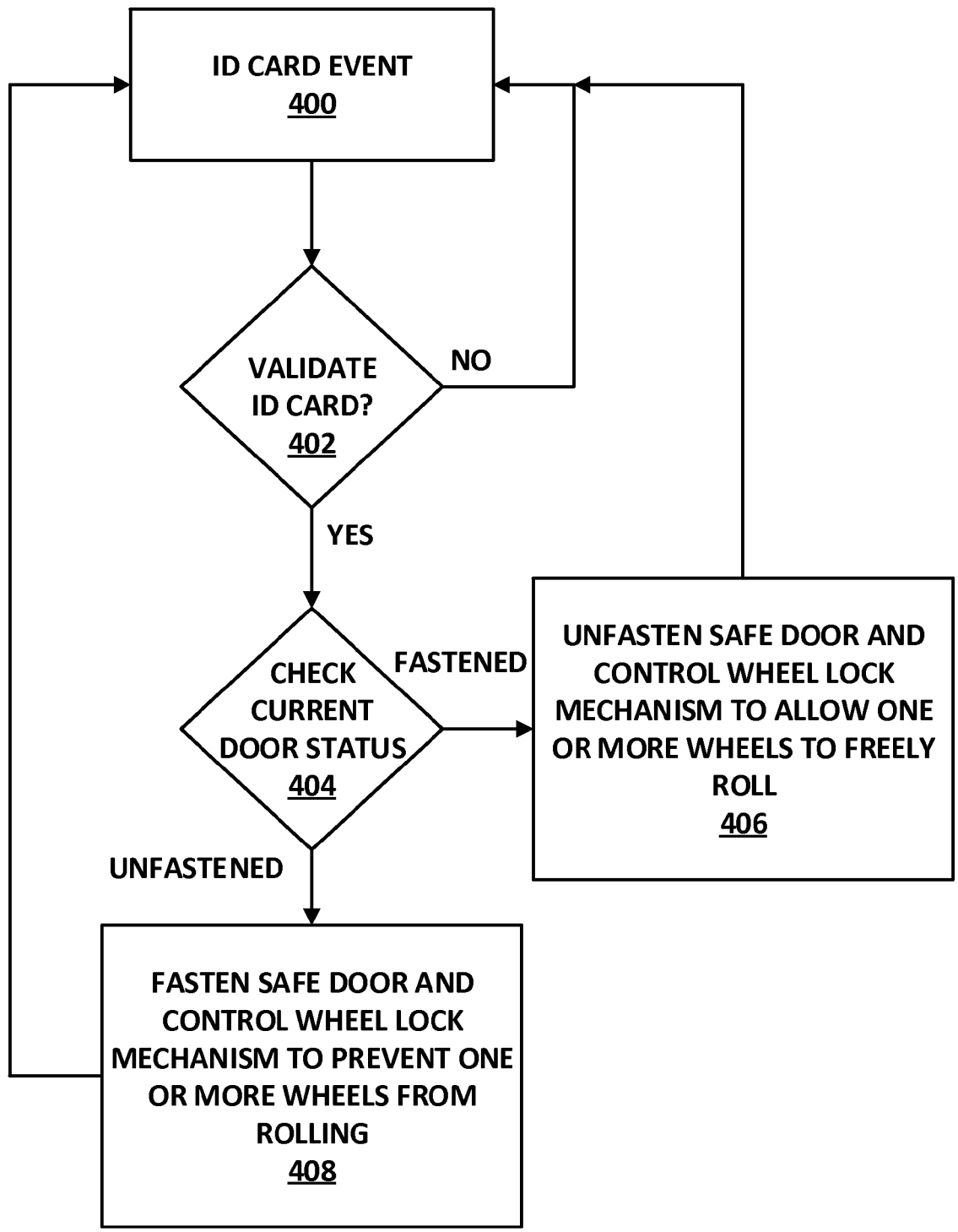
FIG. 4 is a flowchart of an example method for securing objects within a shopping cart safe in accordance with embodiments of the present disclosure.

In accordance with embodiments of the present disclosure, FIG. 4 illustrates a flowchart of an example method for securing objects within a shopping cart safe. This example method is described as being implemented by the lock 126 shown in FIGS. 1 and 2, although it should be understood that the method may be implemented by any suitable lock or system.

Referring to FIG. 4, the method includes determining 400 an identification (ID) card event. For example, the controller 202 shown in FIG. 2 may determine an ID card event. In this example, the controller 202 may receive a security information read by the interface 200 as described in examples herein. The security information may be read from a customer loyalty card.

Subsequently, the method includes determining 402 whether to validate the ID card. Continuing the example, the controller 202 may determine whether to valid security information read from the ID card. Security information may be validated in accordance with examples disclosed herein or by any suitable technique. In response to determining that the ID card is not valid, the method may not take any action and proceed to block 400. In response to determining that the ID card is valid, the method may proceed to block 404.

At block 404, the method includes checking current door status. Continuing the aforementioned example, the door 120 may be in a fastened or unfastened state. Suitable sensors may detect a state of the door 120 and communicate an indication of the state to the controller 202. Based on the indication, the controller 202 may determine that the door 120 is fastened or unfastened. In response to determining that the door is fastened, the method may proceed to block 406. In response to determining that the door is unfastened, the method may proceed to block 408.

At block 406, the method includes unfastening the safe door and controlling a wheel lock mechanism to allow one or more wheels to freely roll. Continuing the aforementioned example, the controller 202 may communicate instructions to the safe lock mechanism and control 204 and the wheel lock mechanism and control 210 for unfastening the safe door 120 and for allowing one of the wheels 104 to freely roll, respectively.

At block 408, the method includes fastening the safe door and controlling a wheel lock mechanism to prevent one or more wheels from rolling. Continuing the aforementioned example, the controller 202 may communicate instructions to the safe lock mechanism and control 204 and the wheel lock mechanism and control 210 for fastening the safe door 120 and for preventing one of the wheels 104 from rolling, respectively.

Subsequent to either block 408 or 410, the method may proceed to block 400 to await another ID card event.

In accordance with embodiments, the interface 200 may be any suitable interface with which a shopper may interact for entering security information for use in the examples disclosed herein. For example, the interface 200 may be a reader as disclosed herein. In another example, the interface 200 may be a keypad by which the user may enter an identifier or code. Further, the interface 200 may be configured to receive commands for fastening or unfastening the safe door, or locking or unlocking one or more wheels of the shopping cart.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed:

1. A shopping container comprising:
   a load carrier;
   a plurality of wheels attached to the load carrier;
   a wheel lock mechanism attached to one of the wheels;
   a safe being attached to the load carrier and comprising a door and a lock, wherein the lock comprises at least a processor and memory being configured to:
   receive security information from an object;
   determine whether to validate the received security information;
   determine whether the door is unfastened;
   determine whether the door is fastened; and
   in response to determining to validate the received security information, and whether the door is unfastened:
   (i) control the door of the safe to be fastened; and
   (ii) transmit a signal to the wheel lock mechanism to prevent the plurality of wheels to freely roll; and
   in response to determining to validate the received security information, and whether the door is fastened:

(i) control the door of the safe to be unfastened; and
(ii) transmit a signal to the wheel lock mechanism to allow the plurality of wheels to freely roll.

2. The shopping container of claim 1, wherein the load carrier comprises a rearward-facing side, and
wherein the safe is attached to the rearward-facing side of the load carrier.

3. The shopping container of claim 2, further comprising a handle attached to the rearward-facing side, and
wherein the safe is positioned downward with respect to the handle.

4. The shopping container of claim 1, wherein the object is a card comprising one of a barcode and a magnetic stripe configured to store the security information, and
wherein the lock is configured to interface with the card to receive the security information.

5. The shopping container of claim 1, wherein the object is an electronic device configured to store the security information and to wirelessly communicate, and
wherein the lock is configured to wirelessly communicate with the electronic device to receive the security information.

6. The shopping container of claim 1, wherein the object includes a radio-frequency identification (RFID) tag that stores the security information, and
wherein the lock is configured to interface with the RFID tag to receive the security information.

7. The shopping container of claim 1, wherein the object is a customer loyalty card configured to store the security information, and
wherein the lock is configured to interface with the customer loyalty card to receive the security information.

8. The shopping container of claim 7, wherein the security information is a customer identifier.

9. The shopping container of claim 1, wherein the lock comprises at least a processor and memory configured to prevent the one of fasten and unfasten the door of the safe in response to determining not to validate the received security information.

\* \* \* \* \*